United States Patent
Tsien

(10) Patent No.: US 7,155,230 B2
(45) Date of Patent: Dec. 26, 2006

(54) DYNAMIC FREQUENCY SELECTION AND RADAR DETECTION WITH A WIRELESS LAN

(75) Inventor: Chih C. Tsien, San Diego, CA (US)

(73) Assignee: Intel Corporation, Santa Clara, CA (US)

( * ) Notice: Subject to any disclaimer, the term of this patent is extended or adjusted under 35 U.S.C. 154(b) by 553 days.

(21) Appl. No.: 10/223,251

(22) Filed: Aug. 19, 2002

(65) Prior Publication Data
US 2004/0033789 A1 Feb. 19, 2004

(51) Int. Cl.
*H04Q 7/20* (2006.01)
*H04B 7/00* (2006.01)

(52) U.S. Cl. .................. 455/450; 455/452.2; 455/464; 455/509; 455/513; 455/226.2

(58) Field of Classification Search ................ 455/450, 455/452.1, 452.2, 462–464, 465, 426.1, 426.2, 455/423, 424, 63.1, 63.3, 67.11, 67.13, 500, 455/501, 507, 509, 62, 226.1, 226.2, 296, 455/334, 336, 337; 342/57, 159
See application file for complete search history.

(56) References Cited

U.S. PATENT DOCUMENTS

| | | | |
|---|---|---|---|
| 4,698,632 A * | 10/1987 | Baba et al. | 342/17 |
| 5,655,217 A * | 8/1997 | Lemson | 455/513 |
| 5,933,420 A | 8/1999 | Jaszewski et al. | |
| 6,694,141 B1 * | 2/2004 | Pulkkinen et al. | 455/454 |
| 6,697,013 B1 * | 2/2004 | McFarland et al. | 342/159 |
| 6,839,331 B1 * | 1/2005 | Rudnick | 370/312 |
| 6,882,851 B1 * | 4/2005 | Sugar et al. | 455/454 |
| 6,891,496 B1 * | 5/2005 | Husted et al. | 342/57 |
| 2002/0003488 A1 * | 1/2002 | Levin et al. | 342/70 |
| 2002/0155811 A1 * | 10/2002 | Prismantas et al. | 455/63 |
| 2002/0181417 A1 * | 12/2002 | Malhotra et al. | 370/329 |
| 2002/0188723 A1 * | 12/2002 | Choi et al. | 709/225 |

FOREIGN PATENT DOCUMENTS

| | | |
|---|---|---|
| JP | 6037762 | 2/1994 |
| JP | 2001237846 | 8/2001 |
| JP | 2001237847 | 8/2001 |
| WO | PCT/US/03/24104 | 7/2003 |

OTHER PUBLICATIONS

Andre Myles (Cisco Systems), "Report of ad hoc group relating to DFS and JPT5G proposal", Jan. 2002, IEEE 802.RR-02/018A-d1, XP002263848, pp. 1-20.

Agenda & Minutes (Unconfirmed) IEEE 802 LMSC Executive Committee Meeting, Online! Nov. 16, 2001, pp. 1-98, XP002263849. Retrieved from the Internet http://www.ieee802.org. minutes/nov2001/MinutesFri11162001.pdf.

(Continued)

*Primary Examiner*—Duc M. Nguyen
(74) *Attorney, Agent, or Firm*—Schwabe, Williamson & Wyatt, P.C.

(57) ABSTRACT

A receiver in a wireless communication system detects a possibly interfering radar signal, and uses dynamic frequency selection to switch to a non-interfering channel. The power level and the channel of the radar signal may be detected. When a radar signal that exceeds a predetermined power level is detected, the receiver may be tuned until the channel of the radar signal matches the communication receiver channel. The communication receiver may then be tuned to a higher quality channel to mitigate or avoid interference between communication signals and the radar signal.

20 Claims, 3 Drawing Sheets

OTHER PUBLICATIONS

Kerry S. J. et al., "Liaison on the compatiblity between IEEE 802.11a and radars in the Radiolocation and Radionavigation service in the 52-53-5350 MHz and 5470-5725 MHz bands." DOC. IEE 802.11-01/081R2. Jan. 17, 2001, pp. 1-6, XP002180310. Retrieved from the Internet: hhtp://www.ieee802.org/Regulatory/Meeting_documents/2001_Jan/1081r28R-Liaison-Be.

* cited by examiner

DYNAMIC FREQUENCY SELECTION AND RADAR DETECTION WITH A WIRELESS LAN

BACKGROUND

Wireless local area network (LAN) equipment operating in a 5 GHz band may have dynamic frequency selection (DFS) capability based on European Radio Communications Committee decision. Wireless LAN (WLAN) and radar equipment operating at the 5 GHz band may interfere with each other when operating at the same frequencies and within the operating range. In order to protect radar operation, the WLAN system or device should detect radar signals first to avoid collision with radar channel during an initiate phase. In addition, the WLAN should periodically re-check the operating channel frequency since the radar source may be moving such as airborne radar.

Implementation of dynamic frequency selection specifies that radar signals having a level of at least −52 dBm should be detected. Next, a response to a detected radar signal should result in a switch to an available channel. A best or better available channel should be selected with uniform spreading over the operating band.

Detecting a radar signal is an issue in implementing dynamic frequency selection since the radar signal characteristics may be different from wireless LAN signal characteristics. Typical radar signal ranges may be:

| Signal Bandwidth: | 0.7 MHz to 150 MHz |
|---|---|
| Pulse repetition rate: | 20–100,000 pulses per second |
| Pulse duration: | 0.05–100 us |

Differences between a communication receiver and a radar receiver include bandwidth and time response. Typical 5 GHz wireless LAN systems such as 802.11a and Hiper-LAN-II may be designed for a 17 MHz signal bandwidth, and may exhibit severe distortion from interference by a narrow radar pulse. As a result, it is difficult to use the LAN receiver or system to correctly estimate radar signal power for radar signals that may have differing pulse signal durations.

DESCRIPTION OF THE DRAWING FIGURES.

The numerous advantages of the present invention may be better understood by those skilled in the art by reference to the accompanying figures in which.

DETAILED DESCRIPTION

Figure 1:
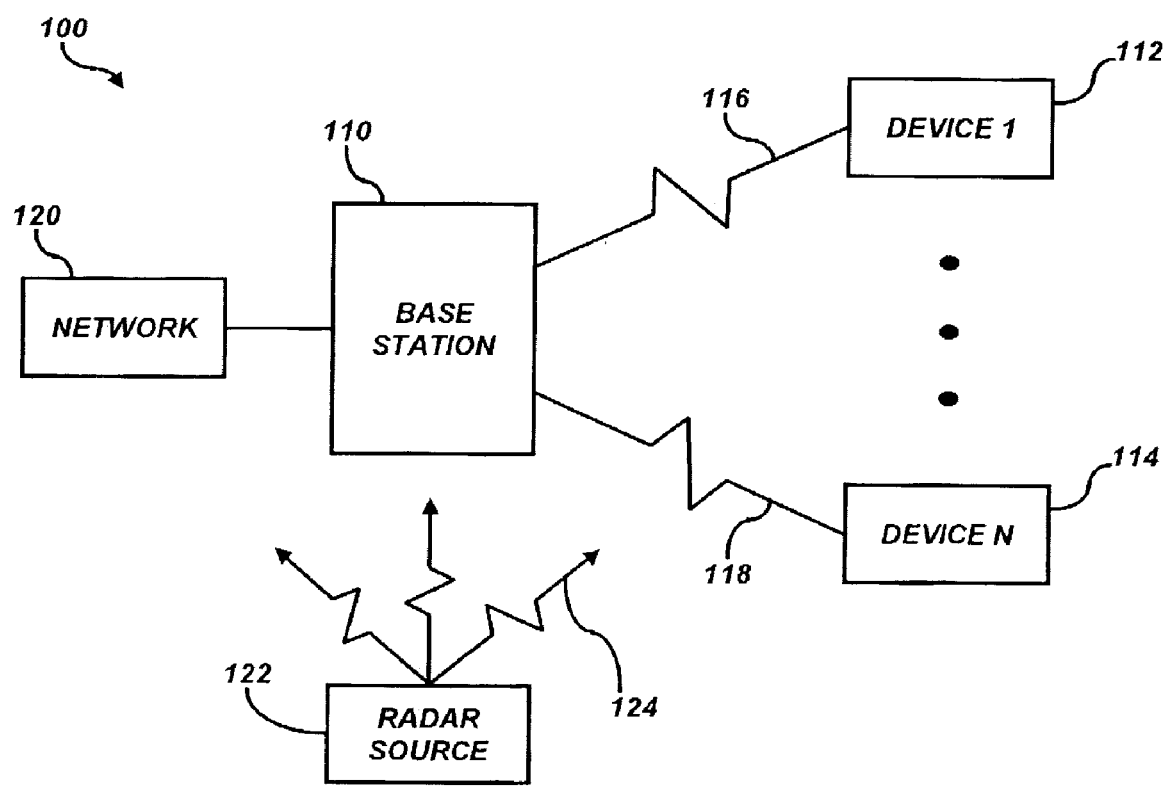
FIG. 1 is a block diagram of a communication system in accordance with one embodiment of the present invention.

Referring now to FIG. 1, a block diagram of a communications system in accordance with an embodiment of the present invention will be discussed. In one embodiment, communications system 100 may include a base station 110 that may communicate with one or more devices 112–114, over one or more communication links 116–118. In one embodiment, at least one or more of communications links 116–118 may be a wireless link, such as a radio-frequency communications link in a cellular telephone network, although the scope of the present invention is not limited in this respect. Devices 112–114 may be wireless phones, personal digital assistants, computers, pagers, portable music players, or any other device capable of communicating with base station 110 via at least one or more communication links 116–118, although the scope of the present invention is not limited in this respect.

In one embodiment, at least one or more of devices 112–114 may be transportable by a user, such as a hand held device, and may be operated by a user while being hand held or otherwise on the person of the user, such as in a pocket, attached to a belt or holster, and so on. Base station 110 may allow devices 112–114 to communicate with other devices 112–114, and may allow devices 112–114 to communicate via network 120. In one embodiment, network 120 may be a wide area network or world wide network such as the Internet, although the scope of the present invention is not limited in this respect.

In one embodiment, at least one or more of devices 112–114 may be battery operated where the battery serves as a power source during operation, and may alternatively be powered from an external power source such as an ac or dc power source, directly, to charge the battery, or to provide supplemental power to the device, although the scope of the present invention is not limited in this respect. In one embodiment of the invention, communications system 100 may comprise a wireless local area network (LAN), a wireless wide area network (WAN) or a cellular network compliant with at least one or more cellular standards, including but not limited to 3GPP, WCDMA, CDMA 2000, GSM-GPRS, GSM-EGPRS, IEEE Standards 802.11 a, 802.11 b, and so on, although the scope of the present invention is not limited in this respect. Other wireless standards may be utilized without departing from the scope of the invention and without providing substantial change thereto.

In one embodiment of the invention, a radar source 122 may emit radar signals 124 that could possible interfere with the operation of base station 110 and devices 112–114. For example, base station 110 and devices 112–114 may operate at a 5 GHz band, so that radar signals 124 may interfere with signals on wireless communication links 116–118, and vice versa. In such an embodiment, base station 110 and devices 112–114 may utilize radar detection and dynamic frequency selection in accordance with one embodiment of the present invention to mitigate, reduce, or eliminate such interference. An example of a wireless LAN system that may incorporate an embodiment of the present invention may include systems compliant with an IEEE 802.11a standard or a Hiper-LAN-II standard, although the scope of the invention is not limited in this respect. Base station 110 and devices 112–114 may include a receiver such as shown in and described with respect to FIG. 2 that implements an embodiment of radar detection and dynamic frequency selection.

Figure 2:
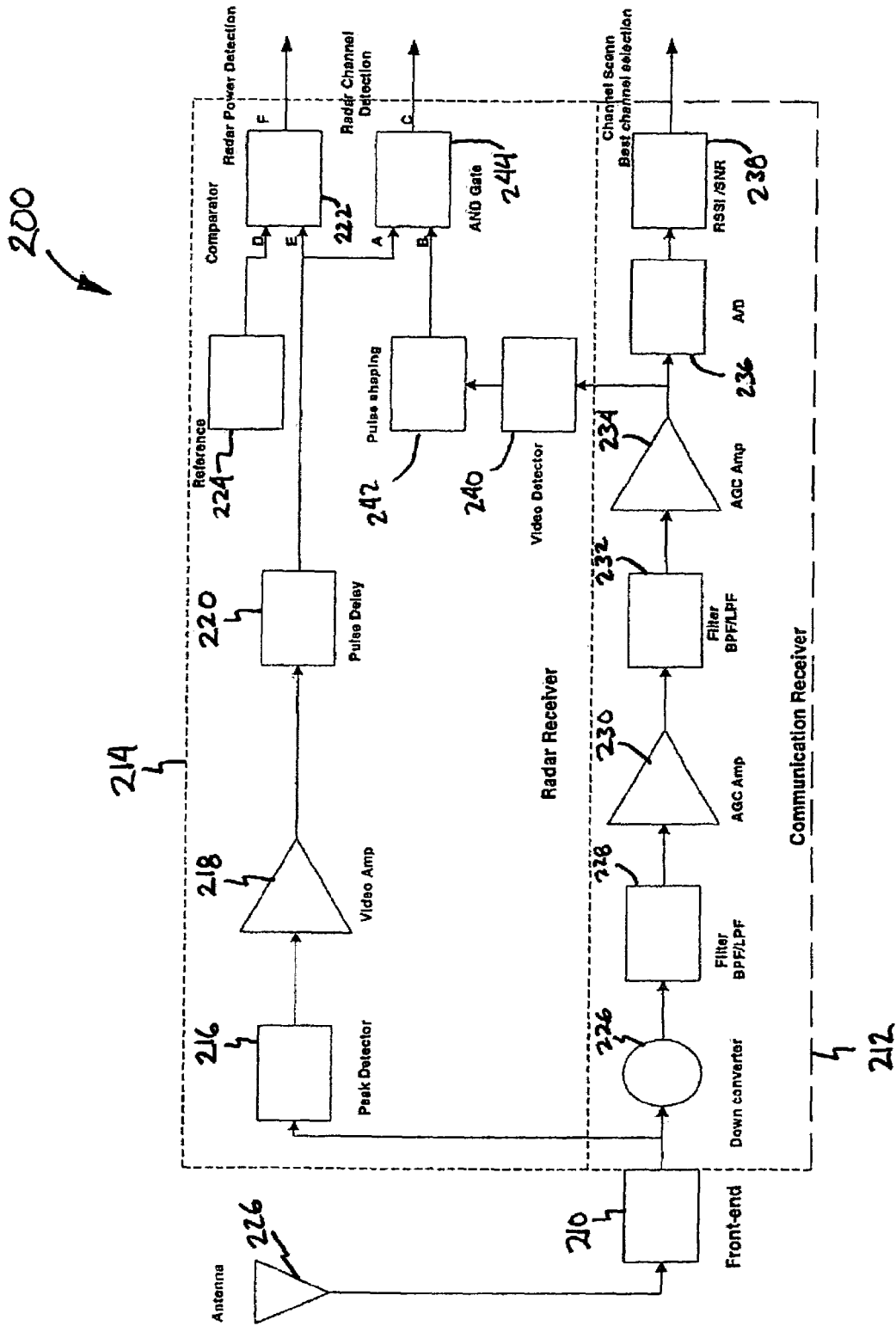
FIG. 2 is a block diagram of a communication system with a radar detection receiver in accordance with one embodiment of the present invention.

Referring now to FIG. 2, a block diagram of a communication system in accordance with an embodiment of the present invention will be discussed. In the diagram of receiver 200, receiver input stage unit 210 may be, for example, a 5 GHz receiver input stage 210 with a wide bandwidth around 675 MHz. Receiver input stage may also be referred to as a front-end and may include one or more filters, although the scope of the invention is not limited in this respect. Receiver 200 may be utilized by base station 110 and devices 112–114 of communications system 100 of FIG. 1. Communication receiver 212 may be a wireless LAN receiver and may have, for example, an 8.5 MHz bandwidth for direct conversion architecture, or alternatively a 17 MHz for double conversion architecture, although the scope of the invention is not limited in this respect. Signals may pass through communication receiver 212 through a down converter 226, filter 228, automatic gain control (AGC) amp 230, filter 232, AGC amp 234, analog-to-digital (A/D) converter 236, and RSSI/SNR unit 238.

Radar receiver 214 may be arranged to detect a radar signal. A radar signal may pass input stage unit 210 and may then pass to peak detector 216. The output of peak detector 216 may be the radar pulse envelope, or video signal. The radar pulse may then pass to video amplifier 218, which may be programmable to match a radar receiver chain gain requirement. A pulse delay unit may be used to compensate the delay time of communication receiver 212 to the delay time of the radar pulse, although the scope of the invention is not limited in this respect. In one embodiment, pulse delay unit 220 may be programmable to match the delay of communication receiver 212. The radar pulse may then feed to comparator 222, which may compare the radar pulse signal with a reference signal from reference signal unit 224. In one embodiment, the level of reference signal provided by reference signal unit 224 may be programmable to adjust the threshold of comparator 222 so that the output of comparator 222 may only occur when the radar input signal level at antenna 226 exceeds a level of −52 dBm. Thus, a high output from comparator 222 may be the radar power indication, indicating that the radar signal power level may be equal to or greater than −52 dBm, although the scope of the invention is not limited in this respect. The repetition rate of the radar signal may be counted to characterize the radar signal as well.

In one embodiment, receiver input stage unit 210 may be broadband in which case radar receiver 214 may only detect the existence of a radar existing and the radar signal power level, but no information may be readily discernable about the radar channel. The radar signal may pass through communication receiver 212 with distortion. As a result, it may be impractical to use communication receiver 212 for power level detection due to the narrow bandwidth of communication receiver 212, and since there may be no fixed relationship between a pulse duration of the radar signal and an output level from automatic gain control (AGC) amplifier 234. However, the pulse shape of the radar signal before analog-to-digital (A/D) converter 236 may still maintain a correct time relationship that may be used to determine a radar channel of the radar signal, although the scope of the invention is not limited in this respect.

Video detector 240, pulse shaping unit 242, and AND gate 244 may perform a radar channel determination operation. The radar pulse passes from AGC amp 234 to video detector 240 and may feed to pulse shaping unit 242. The output from pulse shaping unit 242 may be a copy of the radar pulse, which is then passed to AND gate 244. If the signals at points A and B are both high, and then the output from AND gate 244 at point C is high, an indication may be provided that the radar channel and communication receiver channel are the same channel or at least interfering. While adjusting the communication receiver local oscillator (LO) frequency by scanning until both outputs from comparator 222 and AND gate 244 are high, a radar signal level greater than −52 dBm may be detected, and the channel of communication receiver 212 is the radar channel. Therefore, the radar channel may be determined tuning the channel of communication receiver 212, although the scope of the invention is not limited in this respect. Selection of the best or a better channel may be based on a receiver signal strength indication (RSSI) or signal-to-noise ratio (SNR) measurement with RSSI/SNR unit 238, although the scope of the invention is not limited in this respect.

An indication that the radar signal strength is greater than or equal to −52 dBm may be indicated by the output of comparator 222. An indication of the radar channel may be indicated when the output of AND gate 244 is high, in which case the radar channel may be the same as the channel of communication receiver 212. An indication of channel signal quality may be indicated by RSSI/SNR unit 238 so a higher quality alternative channel may be selected. In one embodiment of the invention, the architecture or receiver 200 may provide dynamic frequency selection for a 5 GHz wireless LAN without requiring communication receiver 212 to change bandwidth, and without requiring changing a sampling rate of A/D converter 236.

Figure 3:
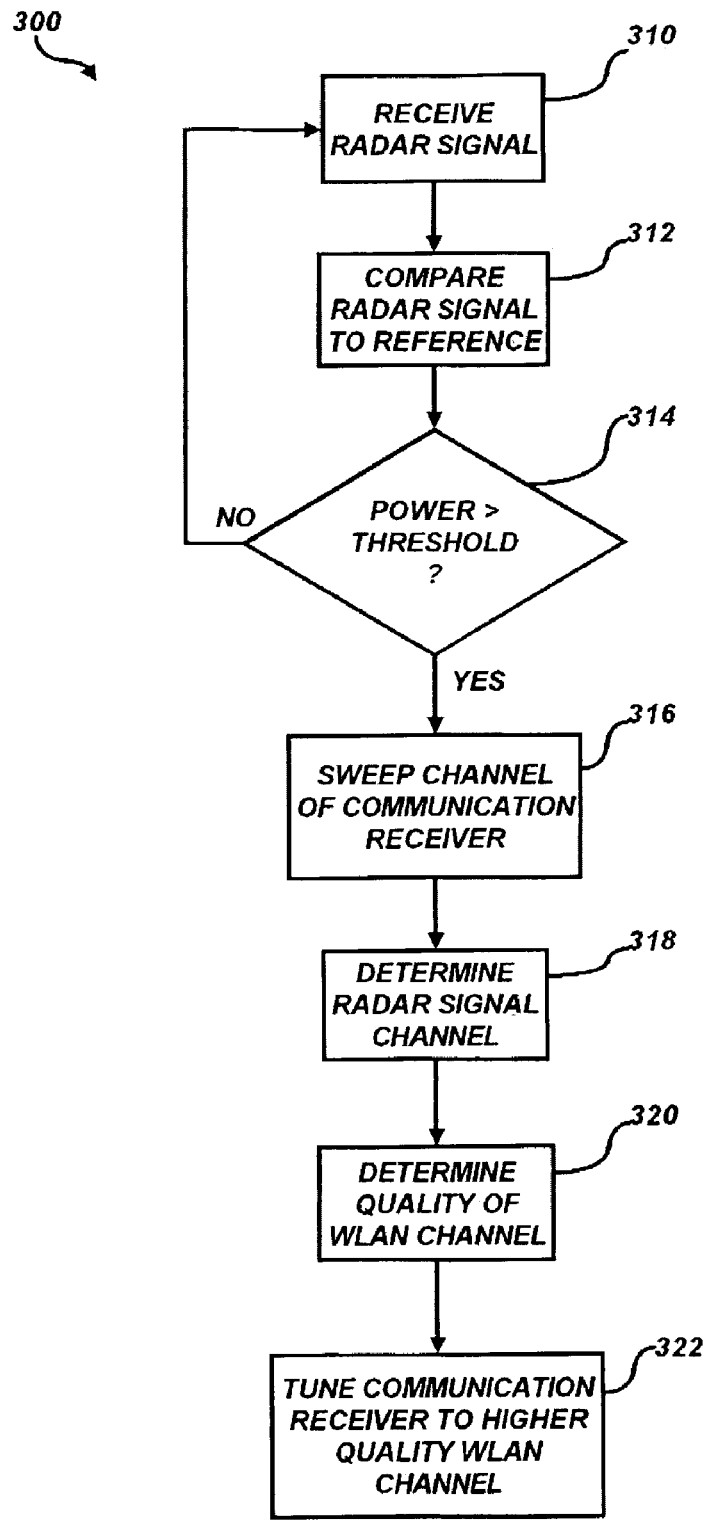
FIG. 3 is a flow chart of a method for radar detection and dynamic frequency selection in accordance with one embodiment of the present invention.

Referring now to FIG. 3, a flow chart of a method for radar detection and dynamic frequency selection in accordance with an embodiment of the present invention will be discussed. The method 300 may begin where a radar signal may be received by receiver 200 at block 310. A comparison between the received radar signal and a reference signal may be made at block 312. A determination may be made at block 314 whether the power of the radar signal is equal to or greater than a predetermined threshold level, for example −52 dBm. In the event the power of the radar signal is determined to be equal to greater than a predetermined level, communication receiver 212 may sweep its channels at block 316 until the channel of communication receiver 316 matches the channel of the radar signal, at which point the radar signal channel may be determined at block 318. A quality of at least one or more channels may be determined at block 320. Communication receiver 322 may then be tuned at block 322 to a higher quality channel.

Although the invention has been described with a certain degree of particularity, it should be recognized that elements thereof may be altered by persons skilled in the art without departing from the spirit and scope of the invention. It is believed that the dynamic frequency selection and radar detection with a wireless LAN of the present invention and many of its attendant advantages will be understood by the forgoing description, and it will be apparent that various changes may be made in the form, construction and arrangement of the components thereof without departing from the scope and spirit of the invention or without sacrificing all of its material advantages, the form herein before described being merely an explanatory embodiment thereof, and further without providing substantial change thereto. It is the intention of the claims to encompass and include such changes.

What is claimed is:

1. An apparatus, comprising:
a wireless local area network device, said wireless local area network device to operate at a frequency of about 2 GHz to about 5 GHz; and
a dynamic frequency selection receiver disposed in said wireless local area device, said dynamic frequency selection receiver comprising:
a receiver input stage;
a communication receiver, said communication receiver includes a down-converter and an receiver signal strength indicator unit; and
a radar receiver coupled to said receiver input stage, said radar receiver includes a peak detector and a comparator, the comparator to compare a radar signal passed from a receiver input stage through said peak detector to said comparator with a reference signal to detect a radar signal having a predetermined power level, said radar receiver further including a video detector, a pulse shaper, and said receiver signal strength indicator unit indicates a quality of a channel of said communication receiver, said communication receiver to select a higher quality channel when the radar signal having a predetermined power level is detected.

2. An apparatus as claimed in claim 1, said radar receiver includes a pulse delay unit to provide a delayed version of the radar signal from the peak detector to the comparator.

3. An apparatus as claimed in claim 1, said radar receiver includes a pulse delay unit to provide a delayed version of the radar signal from the peak detector to the comparator, the pulse delay unit to provide a delay to the radar signal to match a delay of said communication receiver.

4. An apparatus as claimed in claim 1, said radar receiver includes a pulse delay unit to provide a delayed version of the radar signal from the peak detector to the comparator, the pulse delay unit being programmable to provide a delay to the radar signal to match a delay of said communication receiver.

5. An apparatus as claimed in claim 1, said radar receiver further comprising an AND gate, the AND gate to receive a radar signal passed through said communication receiver through the video detector and the pulse shaper, the AND gate to indicate that a channel of the radar signal channel is the same as a channel of said communication receiver selected by the down converter.

6. An apparatus comprising:
a receiver front end;
a communication receiver having a down-converter and a receiver signal strength indicator unit; and
a radar receiver having a peak detector, a pulse delay unit, and a comparator, the pulse delay unit to receive a radar signal from the peak detector and to provide a delay to the radar signal to match a delay of said communication receiver, the comparator to receive the delayed version of the radar signal from the pulse delay unit and to compare said delayed version with a reference signal to detect a radar signal having at least a predetermined power level, and said receiver signal strength indicator unit to indicate a quality of a channel of said communication receiver, said communication receiver to select a higher quality channel when the radar signal having at least the predetermined power level is detected.

7. The apparatus of claim 6, wherein the pulse delay unit is programmable to provide the delay to the radar signal to match the delay of said communication receiver.

8. An apparatus comprising:
a receiver front end;
a communication receiver having a down-converter and a receiver signal strength indicator unit;
a radar receiver having
a peak detector to receive a radar signal from the receiver front end;
a comparator coupled to the peak detector and configured to receive the radar signal to compare the received radar signal to a reference signal to detect a radar signal having at least the predetermined power level, and
a video detector, a pulse shaper, and an AND gate coupled to one another and configured to receive a radar signal passed through the communication receiver and to indicate that a channel of the radar signal is the same as a channel of said communication receiver selected by the down converter; and
said receiver signal strength indicator unit configured to indicate a quality of a channel of said communication receiver, said communication receiver to select a higher quality channel when the radar signal having at least the predetermined power level is detected.

9. A method comprising:
detecting a presence of a radar signal by delaying a received signal by a predetermined delay to match a delay of a communication receiver, and comparing a level of the delayed received signal to a reference level to determine when the delayed received signal has a power level greater than a predetermined power level;
determining a channel on the radar signal by sweeping a channel of a communication receiver until the channel of the communication receiver matches the channel of the radar signal; and
switching the channel of the communication receiver to another channel.

10. An apparatus comprising:
a front end to receive a radar signal;
a communication receiver coupled to the front end and having a first processing chain;
a radar receiver coupled to the front end and having a second processing chain, which is at least partially parallel to the first processing chain, configured to determine that the radar signal has a power level of at least a predetermined power level and to cooperate with the communication receiver to detect one or more channels on which the radar signal is received based at least in part on said determining that the power level is at least the predetermined power level.

11. The apparatus of claim 10, wherein the radar receiver is of a first bandwidth and the communication receiver is of a second bandwidth that is smaller than the first bandwidth.

12. The apparatus of claim 11, wherein the first bandwidth is approximately 17 Megahertz (MHz) or less and the second bandwidth is greater than 17 MHz.

13. The apparatus of claim 12, wherein the second bandwidth is approximately 675 MHz.

14. The apparatus of claim 10, wherein said communication receiver and said radar receiver are disposed in separate integrated circuits.

15. The apparatus of claim 10, wherein the communication receiver is a wireless local area network receiver.

16. The apparatus of claim 10, wherein the communication receiver is configured to tune to each of a plurality of channels and to provide a signal for each of the tuned-to plurality of channels, and the radar receiver is configured to detect the one or more channels on which the radar signal is received based at least in part on said provided signals from each of the tuned-to plurality of channels.

17. The apparatus of claim 16, wherein the communication receiver is further configured to determine a channel quality of each of the plurality of channels.

18. A method comprising:
receiving a radar signal;
determining, with a first processing chain of a radar receiver, that the radar signal has a power level of at least a predetermined power level; and
detecting, with the radar receiver in cooperation with a communication receiver having a second processing chain, which is at least partially parallel with the first processing chain, one or more channels on which the radar signal is received based at least in part on said determining that the power level is at least the predetermined power level.

19. The method of claim 18, wherein said detecting of the one or more channels on which the radar signal is received further comprises:
tuning, by the communication receiver, to each of a plurality of channels; and
providing, by the communication receiver to the radar receiver, a signal for each of the tuned-to plurality of channels.

20. The method of claim 19, further comprising:
determining a channel quality for each of the plurality of channels.

* * * * *